March 5, 1968 T. LERNER 3,372,391
AUTOMATIC FREQUENCY CONTROL FOR RADAR RECEIVERS
Filed Feb. 1, 1960 3 Sheets-Sheet 1
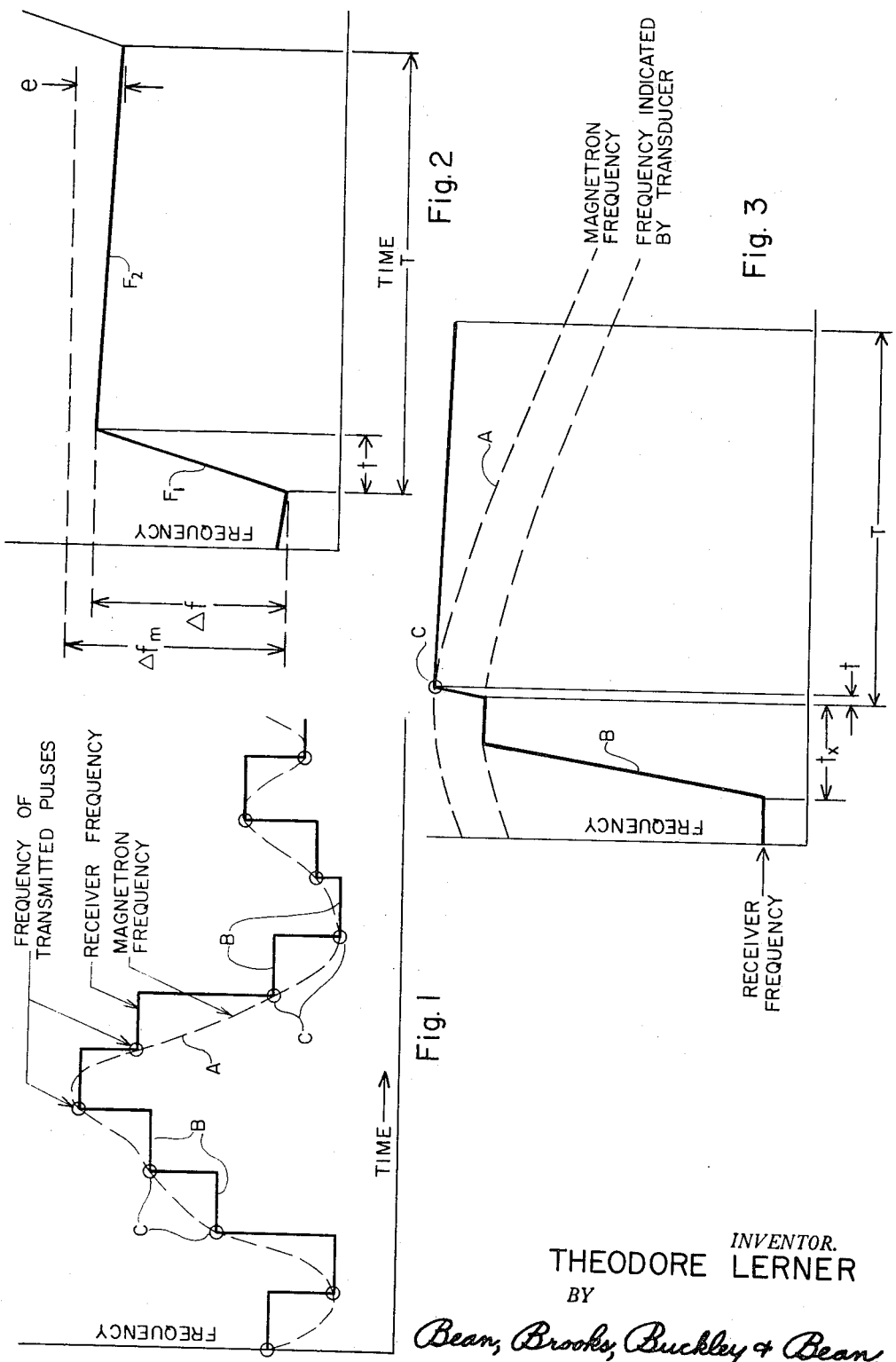
INVENTOR.
THEODORE LERNER
BY
Bean, Brooks, Buckley & Bean.
ATTORNEYS

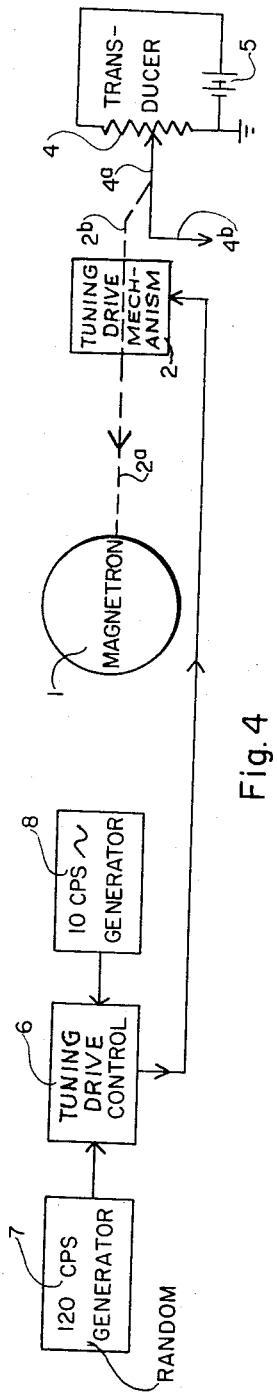
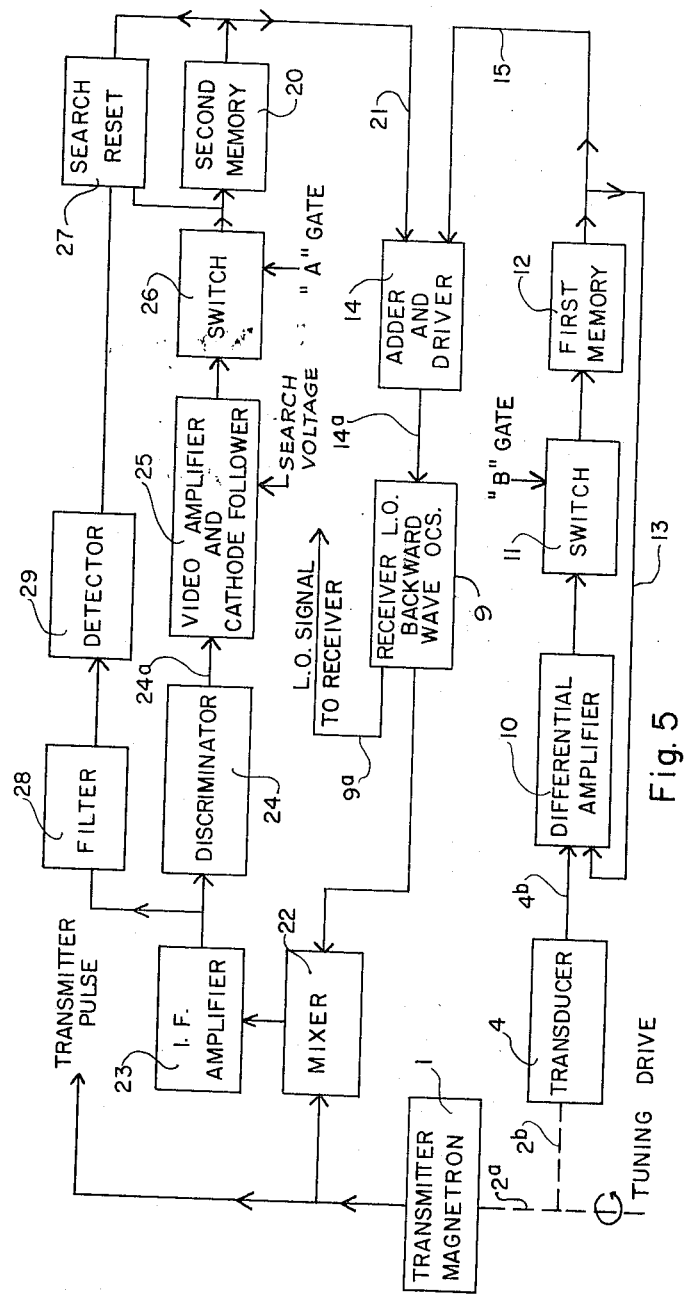

March 5, 1968 T. LERNER 3,372,391
AUTOMATIC FREQUENCY CONTROL FOR RADAR RECEIVERS
Filed Feb. 1, 1960 3 Sheets-Sheet 3

INVENTOR.
THEODORE LERNER
BY
Bean, Brooks, Buckley & Bean
ATTORNEYS

United States Patent Office 3,372,391
Patented Mar. 5, 1968

3,372,391
AUTOMATIC FREQUENCY CONTROL FOR
RADAR RECEIVERS
Theodore Lerner, Buffalo, N.Y., assignor, by mesne assignments, to Bell Aerospace Corporation, Wheatfield, N.Y., a corporation of Delaware
Filed Feb. 1, 1960, Ser. No. 5,881
16 Claims. (Cl. 343—17.1)

This invention relates primarily to radar and analogous systems, and more specifically to an improved means for automatically tuning a radar signal echo receiver to receive the frequency of the last transmitted radar pulse, particularly where each transmitted pulse varies in frequency by a large amount from adjacent pulses.

While not necessarily limited thereto, the present invention is primarily concerned with anti-jam radar capable of changing frequency in large steps between transmitted pulses, the frequency changes between transmitted pulses being sufficiently large and uncorrelated that a narrow frequency band jammer, after detecting one pulse, will not be able to jam the echoes resulting from succeeding pulses because such succeeding pulses will be at frequencies which are outside the band of the jammer and not predictable in frequency from detection of preceding pulses.

The effectiveness of a radar, operating against a jammer, can be expressed as the ratio of information obtained with the jammer in operation to the information that would be obtained in the absence of jamming. If the radar frequency is tuned away from the jammer frequency the effectiveness of the radar will increase because the jamming signal will be attenuated in direct proportion to the off-frequency response of the radar receiver, whereas the desired echo signals will be unaffected provided the radar receiver remains tuned during each interpulse period to the last radar transmitted pulse to receive the desired echo signals therefrom. Therefore, the effectiveness of a tunable radar in avoiding jamming is a direct function of the ratio of radar frequency agility to jammer frequency agility.

Probably the most important limitation on the speed at which the radar can tune arises from the fact that the receiver must always remain tuned to the frequency of the last transmitted pulse if it is to receive echo signals therefrom. By way of illustration, consider a rapid-tune radar having a perfect conventional AFC (automatic frequency control), whereby the receiver always is tuned exactly to the transmitter. Assuming that the transmitter is tuning at a rate of M mc./s., if the pulse repetition frequency is P p.p.s., the radar will tune $M/P$ mc. between pulses. If the receiver is following the transmitter, the receiver will be detuned by an amount $M/P$ mc. at the end of the pulse period. If the maximum allowable detuning of the receiver for a good presentation were F mc., the maximum tuning rate would be given by $M_{max}=PF$.

If the above maximum rate is to be exceeded, to produce a comparatively large change in transmitter frequency between successive pulses, some means must be used for tuning the receiver to the transmitter during the transmitted pulse, and then holding the receiver tuned to this frequency during the interpulse period, and the provision of such means is a primary object of this invention.

It is another object of this invention to provide the foregoing in a system which is not significantly larger in size or weight than a conventional radar receiver-transmitter unit, and which is not unduly complicated or expensive compared to conventional radar.

This invention provides a radar pulse generator using a cavity resonator, the presently preferred transmitter generator comprising a magnetron which can be tuned very rapidly, for example by means of a hydraulic drive or a mechanical drive. The present invention provides a novel receiver AFC, characterized as follows: Near the time when the transmitted pulse occurs, the receiver local oscillator is roughly tuned to approximately the correct frequency by means of a transducer driven by the drive means used to vary the magnetron frequency. A final correction to the receiver tuning is then made during the transmitted pulse by an AFC circuit. After the transmitted pulse, the AFC circuit is open and the receiver remains tuned to the frequency of the transmitted pulse substantially until the next transmitted pulse when the coarse and fine tuning cycle is repeated.

It is a feature of this invention that the accuracy of the matching of the transducer and its associated circuitry to the magnetron frequency does not have to be exceedingly high in order to yield satisfactory AFC operation. In particular, errors which are constant across the frequency band being tuned may be very large without deteriorating the performance of the AFC, since these errors are completely removed during further operation of the system. The effect of errors in slope are reduced by an order of magnitude.

The foregoing and other objects, advantages and characterizing features of this invention will become clearly apparent from the ensuing detailed analysis and description of a presently preferred embodiment thereof, considered in conjunction with the accompanying drawings forming a part hereof wherein:

FIG. 1 is a graphical representation of the ideal receiver tuning characteristic according to the present invention when frequency excursions between transmitted pulses are large;

FIG. 2 is a graphical representation illustrating practical factors involved in receiver-tuning during a single pulse period;

FIG. 3 is a graphical representation similar to FIG. 2 but showing the receiver tuning characteristic as compared with the tuning characteristic of the transmitter;

FIG. 4 is a block diagram showing one form of magnetron frequency control suitable for use with this invention;

FIG. 5 is a simplified block diagram of a complete receiver AFC arrangement according to this invention;

Figure 6:
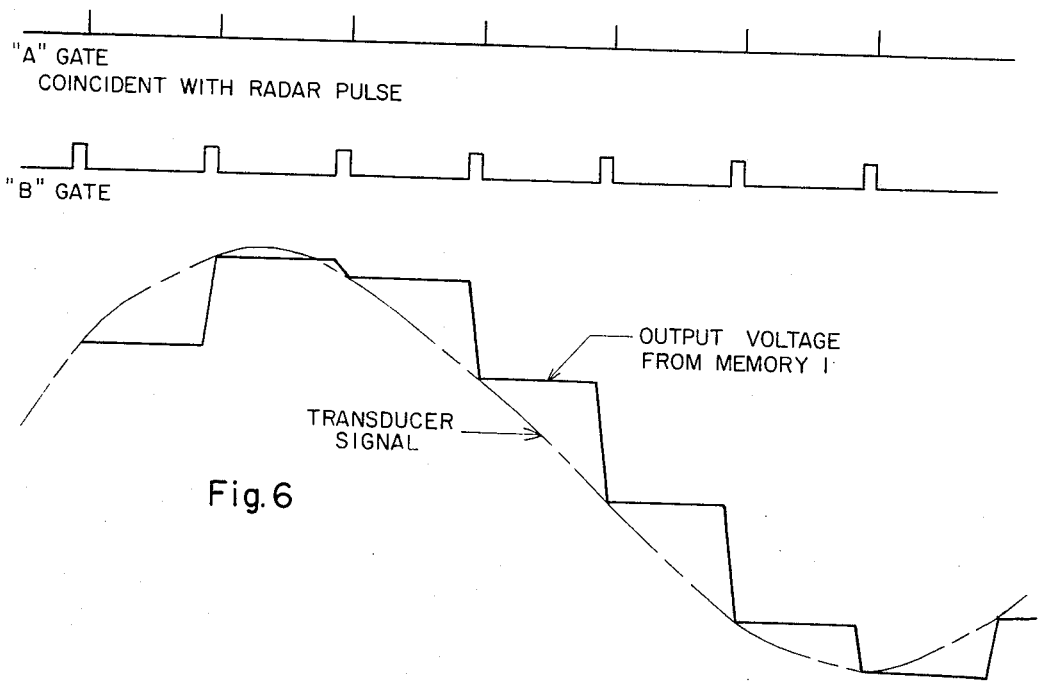
Figure 7:
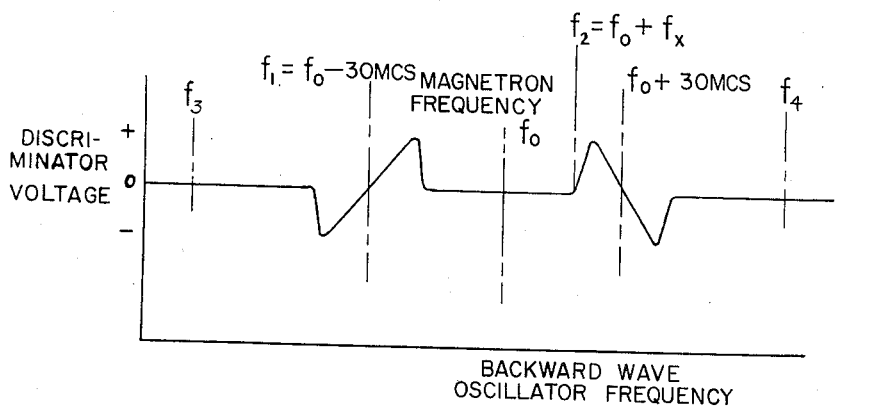

FIG. 6 is a graphical representation showing two different gate signals synchronized to the radar PRF (pulse repetition frequency) and columnized above a curve showing the transducer output signal and the output of the first memory circuit superimposed; and FIG. 7 is a graphical representation showing the characteristic of a detector used for searching the frequency-control spectrum for the correct receiver local-oscillator frequency as compared with the magnetron frequency.

Pulse-to-pulse tuning is obtained whenever the transmitter frequency is changed by a finite amount between successive pulses. However, the present usage of the term pulse-to-pulse tuning refers to a comparatively large change of transmitter frequency between successive pulses.

There are two major problems involved in obtaining a usable pulse-to-pulse tuning radar. The first problem is the attainment of a sufficiently high transmitter tuning rate to provide a reasonably large change in transmitter frequency between successive pulses. The second and more difficult problem, to which this invention is particularly directed, is the attainment of a control to maintain the receiver tuned to the frequency of the last transmitted pulse during each interpulse period.

The following analysis of these problems is presented to provide a better understanding of this invention.

MAGNETRON TUNING

Random pulse-to-pulse frequency variation can be obtained, for example, by tuning the magnetron in accordance with a more-or-less random sine wave somewhere in the vicinity of 50–120 c.p.s. with a peak-to-peak amplitude capable of providing a frequency change of 500 mc., and this sine wave being superimposed on a sine wave of, for example 10 c.p.s., with a peak-to-peak amplitude likewise capable of providing a frequency change of 500 mc. The transmitted pulses can occur, for example at a pulse repetition frequency of 500 p.p.s., in this example the frequency spacing between pulses being large and there being no predictable relationship between the frequencies of the pulses which occur during one excursion and those during the next excursion. The relationship between the frequencies of the pulses can be further complicated by using tuning frequencies which are not harmonically related to the PRF, by using a more complex tuning wave shape, or by varying the frequency of the tuning cycle.

A simple and inexpensive pulse-to-pulse tunable transmitter can be obtained by actuating a plunger-tuned magnetron with a motor driven cam and cam-follower assembly. The cam can be cut to provide any tuning characteristic within the velocity and acceleration limits of the magnetron, and the speed of the motor can be continuously varied to provide a changing tuning characteristic.

A more versatile pulse-to-pulse tuning magnetron transmitter can be obtained by operating a plunger-tuned magnetron with a hydraulic valve and actuator assembly. The tuning characteristic of this device can be easily varied when it is controlled by the current waveform supplied to a hydraulic valve. A linear integrated hydraulic valve and actuator assembly having internal feedback has been developed by Bell Aircraft Corporation, which assembly provides a plunger displacement which is a linear function of the valve input current and can be readily adapted to operate a plunger-tuned magnetron.

It has been verified that the tuning capabilities described above can be obtained by magnetrons which can yield a tuning rate of over 150 c.p.s. with an excursion of 500 mc. The life of such a magnetron is estimated as between 20 and 40 million tuning cycles. This represents a life of between 40 and 80 hours of continuous tuning. Tuning rates of up to 800 c.p.s. can be obtained; however, the driving power required tends to become excessive at these very high rates and it is not necessary to use such very high tuning rates to provide large frequency jumps between radar pulses. Thus, tuning rates can be obtained which, for all practical purposes, yield a pulse-to-pulse frequency change which is so great as to prevent the prediction of the frequency of the next transmitted pulse from a knowledge of the history of the frequencies of previous pulses. The frequency separation between transmitter pulses will be large enough so that a limited bandwidth jammer, when transmitting at the frequency of the one radar pulse which it has detected will not interfere with the reception of radar information from the next pulse. The use of a magnetron as the pulse generator is highly desirable, because a magnetron type of oscillator can develop a relatively large power output at extremely high frequencies, with reasonably good efficiency. By way of specific example, it has been found that Magnetron #3211 as listed in the current catalogue of Litton Industries, San Carlos, Calif., functions satisfactorily in this application. The principle of the tuning of this magnetron cavity is disclosed and discussed in Patent 2,799,802, which shows a simple mechanical operator means which can, if desired, be replaced by one of the power-actuated types of operator referred to above.

RECEIVER AUTOMATIC FREQUENCY CONTROL

The dashed line A of FIGURE 1 represents an arbitrary magnetron transmitter frequency tuning characteristic with successive pulse transmissions occurring at times as represented by the circles C. If the echoes of these transmitted pulses are to be received, the receiver must be provided with a tuning characteristic as shown by the solid line B. In order to obtain this receiver tuning characteristic, the receiver must be tuned to each new transmitted pulse frequency during the time of the transmitted pulse, and memory means must be provided to maintain the receiver tuned to the frequency of the last pulse during the following interpulse period.

FIG. 2 illustrates a receiver tuning characteristic for a single pulse period. Here:

$f_m$ = error in receiver tuning at the end of an interpulse period.
$f$ = receiver tuning during a single magnetron pulse.
$t$ = duration of magnetron pulse.
$T$ = pulse repetition period.
$F_1$ = receiver frequency correction rate.
$F_2$ = receiver frequency drift rate.
$e$ = receiver tuning error at the end of the interpulse interval.

Considering now some of the general principles involved in providing a workable apparatus, the error $e$ is the result of an imperfect memory. In a practical system the memory function is provided by a capacitor. During the time $t$ of the transmitted pulse the capacitor is charged to a voltage corresponding to the required receiver local oscillator frequency. During the interpulse period $T-t$ the capacitor must substantially hold this voltage. Since there is a finite leakage resistance, the capacitor will discharge by a small amount during the interpulse period and the receiver will drift, and in order to improve the memory the capacitor should be made large. However, since there is a finite charging resistance during the time $t$ of the transmitted pulse, the capacitor cannot be made too large without seriously slowing down the AFC operation. It is evident that for any given pulse width and PRF there will be an optimum value of memory capacity, and with an optimum value of memory capacitor the feasibility of being able to control the receiver frequency during the short time $t$ of the transmitter pulse and of holding the frequency with a small error during the long interpulse interval $T-t$ depends upon how high a ratio of leakage to charging resistance can practically be obtained in the switch.

To accomplish full receiver tuning during the time $t$ of the pulse with a large pulse-to-pulse frequency change is difficult and complex. The amount of receiver tuning required during the time $t$ of the magnetron pulse must be maintained at a small fraction of the total magnetron tuning range, if the receiver tuning error is to be kept small enough to allow the use of the optimum receiver bandwidth as determined by the transmitter pulse length. This is accomplished by the instant invention, as follows. Near the end of an interpulse period the receiver frequency is retuned to approximate the magnetron frequency, thereby minimizing the amount of receiver frequency correction required to obtain exact tuning during the time $t$ of the magnetron pulse. FIG. 3 illustrates this type of receiver tuning characteristic for a single pulse period. Here an approximate receiver correction is initiated a short time, $t_x$, before the magnetron pulse, and then a final precise correction of receiver frequency is made during the magnetron pulse time $t$. It can be readily seen that using this method of receiver tuning, the error in final precise receiver tuning is determined by the accuracy of the initial approximation of the magnetron frequency rather than by the magnitude of the change of magnetron frequency from pulse to pulse.

FIG. 4 schematically illustrates a mechanical magnetron frequency-varying actuator and a transducer coupled with the mechanical actuator of the frequency varying means. The exemplary circuit of FIG. 4 shows a magnetron 1 which may be tunable in the manner illustrated in the above mentioned U.S. Patent 2,799,802, the magnetron 1 having means capable of tuning the frequency of the magnetron by movement thereof. A tuning drive mechanism 2 has a shaft 2a operable to cause the magnetron tuning device to vary the magnetron frequency. The mechanism 2 also has a shaft 2b which is connected with a transducer comprising for example a potentiometer 4 having its resistance versus rotation taper matched to the tuning displacement characteristic of the magnetron. A battery 5 is connected across the potentiometer 4, and therefore an output voltage is delivered to the lead 4b. The rate of movement of the mechanism 2 is controlled by a suitable tuning drive control 6 which is in turn controlled by two input signals which for the purpose of illustration are derived from a sine wave generator 7 operating around 120 cycle per second and a 10 cycle per second generator 8. The composite effect of the inputs from the generators 7 and 8 to the tuning drive control circuit 6 is to vary the position of the mechanism 2 in accordance with the composite instantaneous amplitude of the two signals from the generators 7 and 8.

As stated above in the specification, other means for tuning the magnetron such as hydraulic means could be substituted in place of the system above described, although the above system is entirely satisfactory for the purpose which it serves.

Referring now to FIGS. 5 and 6, the output along the lead 4b from the transducer 4 is delivered through a differential amplifier 10 to an electronic switch 11 and thence to a first memory circuit 12 which may comprise a capacitor capable of being charged to a predetermined voltage, and said capacitor retaining said charge for a finite period of time, and having very high internal leakage resistance.

By inspection of FIG. 6 it will be seen that there are two gate signals comprising an A gate which is exactly coincident with the radar pulse from the transmitter magnetron 1 and a B gate signal comprising a train of pulses each pulse of which occurs immediately before the main radar pulse from the magnetron 1. The duration of the B gate pulses is unimportant provided they are located beyond the end of the usable radar range and occur prior to the transmission of the next succeeding radar pulse.

The B gate is applied to the switch 11, FIG. 5, and closes the switch for the duration of each B gate pulse. When the switch is closed, voltage from the transducer 4 is fed through the differential amplifier 10 in order to charge the first memory circuit to a voltage proportional to the transducer voltage 4. A portion of the voltage appearing across the charging capacitor within the first memory 12 is fed back via a line 13 to the input of the differential amplifier, and this feedback voltage serves the purpose of providing an error signal which is the difference between the input signal along the lead 4b to the differential amplifier and the output from the first memory circuit 12. It is actually this error signal which is fed through the electronic switch 11 to the input of the first memory circuit 12.

The receiver of the present radar system is not illustrated in its entirety in the drawings, but its local oscillator signal is provided by a backward wave oscillator 9 the frequency of which can be voltage-controlled. This backward wave oscillator delivers the local oscillator signal to the receiver via the line 9a, FIG. 5. On the other hand, the frequency of the backward wave oscillator 9 is controlled by the magnitude of the voltage applied to the oscillator by way of a line 14a coming from an adder and driver stage 14. The output of the first memory circuit 12 is connected by way of the line 15 into the adder and driver stage. The driver portion of stage 14 may comprise a cathode follower the output of which is connected with the line 14a and directly controls the frequency of the backward wave oscillator 9.

The output of the first memory circuit 12, connected into the adder and driver stage 14 by way of the line 15, is added to the output of a second memory stage 20, this stage delivering a fine AFC signal to the adder and driver stage 14 by way of the line 21. The coarse AFC signal from the line 15 tunes the local oscillator approximately, and the fine AFC signal from the line 21 is then added in the adder stage 14 and the composite of these two AFC signals is employed to control the driver stage, which as stated above is a cathode follower connected with the line 14a for controlling the frequency of the backward wave oscillator 9. The second memory circuit 20 comprising the fine AFC is in turn controlled as follows:

The backward wave oscillator 9 delivers a portion of its output signal to a mixer 22, this mixer 22 also receiving a portion of the signal delivered by the transmitter magnetron 1, and the output of the mixer 22 comprising a difference frequency which is fed to an IF amplifier 23. This difference frequency is intended to comprise the IF frequency of the receiver, and the output of the IF amplifier 23 is fed to a frequency discriminator 24 which determines whether or not the difference frequency from the IF amplifier 23 precisely equals the IF frequency of the receiver, for example 30 megacycles.

The output voltage along the line 24a will have a certain value if there is no error whatever, but in the event that the frequency of the backward wave oscillator 9 does not differ from the frequency of the main radar pulse by exactly 30 megacycles the output of the discriminator 24 will vary in one direction or the other depending on whether the frequency of the backward wave oscillator 9 is above or below the desired IF frequency, differing from the radar pulse frequency by 30 megacycles. The output of the discriminator is fed into a video amplifier 25 which preferably includes a cathode follower output, and the signal from the discriminator after amplification to a suitable level is applied through an electronic switch 26 to the second memory circuit 20, the switch 26 being closed by the A gate pulses and maintained closed only for the duration of the main transmitter pulse from the magnetron 1. The voltage appearing at the output of the second memory circuit 20, and possibly comprising the voltage across a condenser serving as the second memory circuit, is thus corrected so as to reach the proper level necessary for correction of the coarse AFC voltage appearing on the line 15. In other words, the voltage appearing on the line 21 comprises a corrective voltage which when added to the voltage appearing on the line 15 in the adder stage 14 delivers a control voltage on the line 14a which sets the frequency of the backward wave oscillator 9 at precisely the correct frequency to deliver a local oscillator signal to the receiver, which signal differs from the frequency of the transmitter magnetron by a frequency equaling the IF of the receiver.

OPERATION OF AFC

In operation, the tuning motor 2 continuously rotates the shafts 2a and 2b at a rate which is a variable depending on the instantaneous composite amplitude of the signals from the generators 7 and 8, whereby the speed of motor 2 is continuously varied. The motor 2, through shaft 2a, varies the frequency of magnetron 1 at a rate which is substantially non-repetitive, and at the same time the motor, through shaft 2b, drives the transducer wiper arm 4a to deliver an output voltage along the line 4b having instantaneous amplitude values which substantially correspond with the instantaneous frequency to which the magnetron 1 is tuned. As stated above, the magnetron is continuously varying in frequency, and therefore it is necessary to provide memory means whereby the receiver can be tuned to the magnetron frequency at the instant that the magnetron delivers a radar pulse and whereby the receiver will remain tuned to the frequency of that pulse until another pulse is delivered by the magnetron. Immediately before the magnetron delivers a radar pulse, a B gate pulse closes the switch 11, and permits the differential amplifier to deliver a charge to the first memory circuit 12 which will correct its output so as to correspond substantially to the frequency of the magnetron at the instant that it delivers this radar pulse.

Then, at the instant when the magnetron is actually delivering the radar pulse, an A gate pulse closes the switch 26 and connects the second memory circuit 20 to the output of the discriminator 24 through the video amplifier 25. The frequency of the backward wave oscillator 9 has at the instant the A gate pulse arrives already been corrected toward the frequency of the magnetron 1 by the output from the first memory circuit 12 through the line 15. The mixer circuit is presently combining a sample of the radar pulse frequency actually being delivered with the present output of the backward wave oscillator and delivering a difference frequency to the IF amplificator 23, which difference frequency would be 30 megacycles, if there were no error in the coarse AFC circuit including the transducer 4, the differential amplifier 10 and the first memory circuit 12. However, ordinarily there will be an error and therefore the frequency delivered to the IF amplifier 23 from the mixer 22 will be different from the desired IF frequency. The discriminator 24 detects this difference and delivers a corrective signal on the line 24a, the value of said signal depending on the amount of the error and the direction of deviation from the desired IF frequency. This corrective signal 24a is delivered through the video amplifier 25 and from the switch 26 which is at this instant being held closed by the A gate pulse, and the corrective signal from the discriminator is impressed upon the second memory circuit 20 and charges it to the value required to precisely correct the frequency of the backward wave oscillator 9 when the output of the second memory circuit 20 is added to the output of the first memory circuit 12 by the adder circuit 14 which then delivers the final corrective AFC signal to the backward wave oscillator 9.

AFC INITIAL SEARCH

The assumption was made in the above description that the error in tuning at the start of the A gate was within the capability of the discriminator to correct, but this is not necessarily true when the system is first turned on, and before it has arrived at stable operation. Therefore a search must be instituted to take out the initial error in frequency of the local oscillator at least to the extent necessary to bring the frequency of the local oscillator close enough to the desired IF frequency so as to permit the discriminator 24 to provide adequate corrective voltage. The search comprises an input voltage in the video amplifier and cathode follower 25 in such a manner that during each radar pulse when the switch 26 is closed by the A gate, the output voltage of the second memory circuit 20 is changed by a small amount thus adding increments of correction to the frequency determined by the first memory circuit 12 and applied to the backward wave oscillator. These increments are added until an output signal is provided at the second memory 20 which output signal corrects the frequency of the backward wave oscillator sufficiently that it falls within the range of fine control of the discriminator 24. When the output frequency of the backward wave oscillator 9 is such that the difference frequency between the output signal from the backward wave oscillator 9 and the magnetron 1 falls within the range of fine control of the discriminator 24, the fine AFC acts to correct out all remaining error. When this occurs the search is either stopped or overridden by the output of the discriminator 24 and the memory circuit is then controlled exclusively by the discriminator 24.

Once the fine AFC circuit including the mixer 22, the discriminator 24, and the second memory circuit 20, have become functional, the second memory remembers any fixed errors in the system and the fine correction voltage then deviates only by an amount sufficient to correct incremental errors which occur from pulse to pulse. Thus fixed errors which may occur in the transducer and its associated circuitry due to initial setting, changes in temperature, line voltage or other environmental conditions, or any other reason, are corrected out by the fine AFC circuit and then remembered in the second memory. Further, since with each action of the fine AFC, all errors are corrected out and memorized in the second memory, the only accuracy requirement of the transducer and its associated circuitry is an incremental accuracy; that is, the transducer need only indicate the change in frequency from pulse to pulse with an accuracy within the range of fine control of the discriminator.

Should the corrective increments inserted in the video amplifier 25 as the search voltages be continued until the maximum correction has been made without placing the frequency within the range of the discriminator, the memory voltage should then be reset and the search started again. Reset means 27 is therefore provided as shown in FIG. 5 to discharge the second memory circuit 20 so that a new search can be instituted.

The actual mechanism employed in providing a search voltage can be made very simply and can comprise a bias voltage on the cathode follower 25 designed to feed a certain increment of charge into the second memory circuit 20 during each A gate pulse. When a signal is finally provided by the discriminator indicating that the error is now within the range of correction of the discriminator 24, these increments are then either stopped or overridden and the memory circuit 20 is then controlled exclusively by the discriminator 24.

If the fixed error is large, and the search has to be made large to accommodate the large error, a difficulty may occur due to the fact that as the backward wave oscillator 9 is swept in frequency about the frequency of the magnetron 1 two discriminator curves will result, one centered on a frequency 30 mc. above the magnetron frequency, the other centered on a frequency 30 mc. below the magnetron frequency. This is illustrated in FIG. 7. If it is desired to operate the local oscillator at a frequency 30 mc. below the magnetron frequency, the AFC circuit will be designed to lock to a positive slope of the discriminator 24. The search would be designed to start at the frequency $f_3$ and search up. It would encounter the first positive slope at the frequency $$f_1 = f_0 - 30 \text{ mc.}$$

which is, of course, the correct frequency, and lock onto this frequency. In the event it missed this frequency, due, for example, to missing magnetron pulses, it would encounter another positive slope at frequency $f_2 = f_0 + f_x$ and would lock onto this frequency resulting in improper operation of the system.

Provisions are made to overcome this difficulty. The filter 28 centered on frequency $f_x$ is connected to the output of the IF amplifier 23. Should the AFC system lock on frequency $f_2$, the IF amplifier 23 will put out a pulse at about the frequency $f_x$ every time the magnetron is pulsed. The filter will pass these pulses to the detector 29, which after a sufficient number of pulses are passed will develop a voltage sufficiently large to operate the reset circuit 27 and return the frequency of the backward wave oscillator to approximately $f_3$ whereupon a new search is started. Should the frequency from the backward wave oscillator 9 get beyond the frequency $f_2$ the search will continue until output voltage from the second memory reaches a value corresponding to the frequency $f_4$ at which time the reset 27 will be actuated by the output voltage from the second memory as explained previously. It should be noted that in FIG. 7 the magnetron frequency $f_1$ as well as all other frequencies are charging from pulse to pulse; however the relationship between the magnetron frequency $f_0$ and the discriminator curves does not change.

In order to determine the performance capability of the system it is useful to evaluate the performance in terms of some typical circuit parameters. The following are considered to be typical:

Radar:

| | P.p.s. |
|---|---|
| PRF | 300 |
| PRF | 1,000 |
| PRF | 2,000 |

IF discriminator lock-in capability: ±15 mc.

Incremental accurary of frequency measurement by transducer: ±5% (this includes errors in the transducer, BWO, and magnetron).

If the maximum incremental accuracy of frequency measurement is ±5% and the IF discriminator lock-in capability is ±15 mc., then the maximum frequency jump allowed between pulses is:

$$\frac{15}{.05} = 300 \text{ mc.}$$

For a PRF of 300 p.p.s. the maximum allowable tuning rate is $$300 \times 300 = 90,000 \text{ mc. sec.}$$

For a PRF of 1,000 p.p.s. the maximum allowable tuning rate is $$1,000 \times 300 = 300,000 \text{ mc. sec.}$$

For a PRF of 2,000 p.p.s. the maximum allowable tuning rate is $$2,000 \times 300 = 600,000 \text{ mc. sec.}$$

Presently available hydraulically tuned magnetrons have a maximum practical tuning capability of 100,000 mc. While the tuning rate may be exceeded, excessively large hydraulic systems are required, and the life of the magnetron may be seriously reduced. Therefore, the limitations on tuning rate imposed by the above described AFC system do not appear to be significant.

The scope of the invention is not to be limited to the exact form shown in the drawings for obviously changes may be made within the scope of the following claims.

I claim:

1. A radar system comprising radar pulse generator means having mechanical pulse-frequency varying means; drive means coupled with said frequency varying means for changing the tuning thereof; pulse echo receiver means having a voltage-tunable local oscillator; transducer means connected with said drive means for delivering a coarse automatic frequency control voltage for said local oscillator, said voltage having an amplitude dependent upon the position of said pulse frequency varying means; fine automatic frequency control means including a mixer receiving a sample of each transmitted pulse and the output of said local oscillator for developing an intermediate frequency, an I.F. amplifier for amplifying said intermediate frequency, a frequency discriminator for developing a fine automatic frequency control voltage for said local oscillator, said control voltage being a function of the difference in frequency between said intermediate frequency and the desired intermediate frequency; and switch means controlled in step with the radar pulse generator to connect said control voltages to correct the frequency of the local oscillator after each echo-pulse receiving period.

2. In a system as set forth in claim 1, control voltage adding means and memory means connected with said local oscillator for maintaining the control voltage constant on the local oscillator during said echo-pulse receiving periods.

3. In a system as set forth in claim 2, said memory means comprising separate first and second memory means, said first memory means being connected to the coarse automatic frequency control through one of said switch means, and said second memory means being connected to the fine automatic frequency control through the other of said switch means, said storage means being connected directly to said adding means, and said second memory means being operable to memorize the error in frequency indicated by the transducer and inserting said memorized error into the adding means in opposition to the actual error from the transducer.

4. In a system as set forth in claim 3, said radar system including means for generating a train of first-gate pulses coinciding with said radar pulses and means for generating a second train of gate pulses each occurring prior to a radar pulse and lasting approximately until the beginning of each first-gate pulse, the second-gate pulses closing the switch means associated with the coarse automatic frequency control and the first-gate pulses closing the switch means associated with the fine automatic frequency control.

5. In a system as set forth in claim 3, differential amplifier means connected to receive the output voltage of said transducer means and the output of the first memory means associated with the coarse automatic frequency control, and said differential amplifier means delivering an error voltage to the second memory means to correct the control voltage therefrom to make it equal the transducer voltage.

6. In a system as set forth in claim 3, search voltage generating means connected to deliver an incremental charge during each radar pulse to the second memory means associated with the fine automatic frequency control to bring the local oscillator frequency initially within the range of the intermediate-frequency discriminator; and means for disconnecting or overriding said search voltage generating means when the discriminator becomes operative, and search reset means operable to reset the second memory means.

7. In a system as set forth in claim 6, means for insuring that said fine automatic frequency control does not lock on the incorrect frequency, said means comprising a filter and a detector, said filter being tuned to the incorrect frequency, and said detector providing a signal to actuate the search reset means when said filter passes the incorrect frequency.

8. A radar system comprising radar pulse generator means having mechanical pulse-frequency varying means; drive means coupled with said frequency-varying means for changing the tuning thereof between successive radar pulses; pulse echo receiver means having a voltage-tunable local oscillator; transducer means connected with said drive means for delivering a coarse automatic frequency control voltage having an amplitude dependent upon the position of said pulse frequency-varying means; fine automatic frequency control means including a mixer connected to receive samples of said radar pulses and said local oscillator frequency and delivering a difference frequency, and said fine automatic frequency control means having intermediate-frequency discriminator means for delivering a fine automatic frequency control voltage proportional to the degree of variation between said difference frequency and the receiver intermediate frequency; adding means and memory means connected to said local oscillator to add said control voltages and to apply the composite voltage to the local oscillator to control its frequency; and switch means controlled in step with the radar pulse generator to connect said control voltages with said memory means.

9. In a system as set forth in claim 8, said memory means comprising voltage-storage means connected to the output of each automatic frequency control through one of said switch means and said storage means being connected directly to said adding means.

10. In a system as set forth in claim 8, said radar system including means for generating a train of first-gate pulses coinciding with said radar pulses and means for generating a second train of gate pulses each occurring prior to a radar pulse and lasting approximately until the beginning of each first-gate pulse, the second-gate pulses closing the switch means associated with the coarse automatic frequency control and the first-gate pulses closing the switch means associated with the fine automatic frequency control.

11. In a system as set forth in claim 8, differential amplifier means connected to receive the output voltage of said transducer means and the output of the memory means associated with the coarse automatic frequency control, and said differential amplifier means delivering an error voltage to the latter memory means to correct the control voltage therefrom to make it equal the transducer voltage.

12. In a system as set forth in claim 8, search voltage generating means connected to deliver an incremental charge during each radar pulse to the memory means associated with the fine automatic frequency control to bring the local oscillator frequency initially within the range of the intermediate-frequency discriminator; and means for disconnecting or overriding said search voltage generating means when the discriminator becomes operative.

13. A radar system comprising tunable radar pulse generator means, pulse echo receiver means having a tunable local oscillator, drive means connected to said pulse generator means for altering the frequency thereof between at least some successive pulses by amounts greater than the bandwidth of said receiver means, coarse control means connected to said drive means to correct the frequency of said local oscillator toward the frequency of said generator means immediately prior to delivery of a pulse therefrom, and fine control means actuated by said generator means to precisely correct the frequency of said local oscillator to the frequency of said generator means during a pulse whereby the local oscillator will remain precisely corrected during interpulse periods until immediately prior to a succeeding pulse.

14. In an anti-jamming radar system having tunable pulse generator means, and pulse echo receiver means having a tunable local oscillator; the improvement consisting of coarse control means including variable transducer means by which the local oscillator is tuned toward said generator means immediately prior to the generation of a pulse thereby, and of fine control means connected to both the output of said generator means and to said local oscillator, by which the local oscillator is precisely tuned to said generator means during pulse generation thereby, and drive means for simultaneously varying said generator means and said transducer means to change the frequency of said generator means between at least some successive pulses by amounts exceeding the receiver bandwidth.

15. In a radar system having tunable pulse generator means, and pulse echo receiver means having a tunable local oscillator; drive means coupled with said generator means for charging the tuning thereof, transducer means connected with said drive means for delivering a voltage variable in accordance with the tuning of said generator means, means connecting said transducer means with said local oscillator immediately prior to the generation of a pulse by said generator means to correct the frequency of the local oscillator toward the frequency of said generator means, and fine control means including a mixer receiving a sample of each generated pulse and of the output of said local oscillator for developing a difference frequency thereof, said fine control means also including means connecting the output of said mixer with said local oscillator during pulse generation, whereby the local oscillator is precisely corrected to the frequency of the preceding pulse during any interpulse period until immediately prior to the succeeding pulse.

16. In a radar system having tunable pulse generator means and pulse echo receiver means having a voltage-tunable local oscillator, variable transducer means for connection to said local oscillator to apply a corrective voltage thereto, drive means connected to both said generator means and said transducer means to vary the tuning of the generator means and simultaneously adjust said transducer means to substantially correspond to the tuning of said generator means, switch means controlled in step with said generator means to connect said transducer means to said local oscillator immediately prior to a generated pulse, whereby the frequency of said local oscillator is adjusted at that time toward the frequency of said generator means, heterodyne means connected to said generator means and said local oscillator to produce an intermediate frequency whose value is that of the difference between local oscillator frequency and generator means frequency during pulse generation, and means connected to said local oscillator and to said heterodyne means for applying a corrective voltage to said local oscillator proportional to said intermediate frequency, the last means including switch means controlled in step with said generator means to be closed during pulse generation.

References Cited
UNITED STATES PATENTS 2,603,744    7/1952    Larson ---------------- 343—5
2,856,600    10/1958    Clevenger ------------ 343—5

RODNEY D. BENNETT, *Primary Examiner.*

FREDERICK M. STRADER, KATHLEEN H. CLAFFY, CHESTER L. JUSTUS, *Examiners.*

D. MEXIC, M. F. HUBLER, *Assistant Examiners.*